(12) United States Patent
Cideciyan et al.

(10) Patent No.: US 7,010,065 B2
(45) Date of Patent: Mar. 7, 2006

(54) METHOD AND APPARATUS FOR WORD SYNCHRONIZATION WITH LARGE CODING DISTANCE AND FAULT TOLERANCE FOR PRML SYSTEMS

(75) Inventors: Roy Daron Cideciyan, Rueschlikon (CH); Jonathan Darrel Coker, Rochester, MN (US); Evangelos S. Eleftheriou, Zurich (CH); Richard Leo Galbraith, Rochester, MN (US); Todd Carter Truax, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 785 days.

(21) Appl. No.: 09/865,877

(22) Filed: May 25, 2001

(65) Prior Publication Data

US 2002/0176523 A1    Nov. 28, 2002

(51) Int. Cl.
*H03D 1/00* (2006.01)

(52) U.S. Cl. .................. 375/341; 375/368; 375/350; 375/354; 714/744; 714/792; 714/704

(58) Field of Classification Search .............. 375/341, 375/368, 263, 354, 240, 350; 714/744, 792, 714/704
See application file for complete search history.

(56) References Cited

U.S. PATENT DOCUMENTS

| | | | |
|---|---|---|---|
| 4,675,871 A | 6/1987 | Gordon et al. ............. 371/46 |
| 5,220,466 A | 6/1993 | Coker et al. ............. 360/46 |
| 5,260,976 A * | 11/1993 | Dolivo et al. ............ 375/341 |
| 5,416,806 A | 5/1995 | Coker et al. ............ 375/354 |
| 5,420,893 A | 5/1995 | Ward .................. 375/368 |
| 5,422,760 A | 6/1995 | Abbott et al. ............ 360/46 |
| 5,521,945 A * | 5/1996 | Knudson ............... 375/341 |
| 5,604,541 A | 2/1997 | Kim et al. .............. 348/426 |
| 5,768,285 A * | 6/1998 | Griep et al. ............ 714/704 |
| 5,822,143 A | 10/1998 | Cloke et al. ............ 360/65 |
| 5,856,986 A * | 1/1999 | Sobey ................ 714/744 |
| 5,966,415 A | 10/1999 | Bliss et al. ............ 375/350 |
| 6,003,153 A * | 12/1999 | Shimoda .............. 714/792 |
| 6,021,011 A | 2/2000 | Behrens et al. ........... 360/51 |
| 6,032,284 A | 2/2000 | Bliss ................ 714/792 |
| 6,091,770 A | 7/2000 | Imura ................ 375/240 |
| 6,115,198 A * | 9/2000 | Reed et al. ............ 360/46 |
| 6,122,118 A | 9/2000 | Sato et al. ............ 360/46 |
| 6,125,156 A * | 9/2000 | Watanabe ............. 375/368 |

* cited by examiner

*Primary Examiner*—Shuwang Liu
*Assistant Examiner*—Eva Zheng
(74) *Attorney, Agent, or Firm*—Joan Pennington

(57) ABSTRACT

A method and apparatus are provided for word synchronization with large coding distance and fault tolerance for a partial-response maximum-likelihood (PRML) data channel in a direct access storage device (DASD). A Viterbi detector receives equalized PR4 samples including a predefined word synchronization pattern. The Viterbi detector is a dedicated detector optimized for detecting the predefined word synchronization pattern. The Viterbi detector includes a two-state Viterbi trellis and a word synchronization detector for the two-state Viterbi trellis. The predefined word synchronization pattern includes only even length magnets. The predefined word synchronization pattern is a repetition code including pairs of ones and pairs of zeros and includes multiple pattern match sequences. The Viterbi detector is optimized with branches removed from the Viterbi trellis, thus increasing coding distance. The two-state Viterbi trellis and word synchronization detector of the Viterbi detector operate on a 2T basis, where 1/T is the sample rate.

15 Claims, 7 Drawing Sheets

METHOD AND APPARATUS FOR WORD SYNCHRONIZATION WITH LARGE CODING DISTANCE AND FAULT TOLERANCE FOR PRML SYSTEMS

FIELD OF THE INVENTION

The present invention relates generally to the data processing field, and more particularly, relates to a method and apparatus for word synchronization with large coding distance and fault tolerance for a partial-response maximum-likelihood (PRML) data channel in a direct access storage device (DASD).

DESCRIPTION OF THE RELATED ART

Disk drive units often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. A partial-response maximum-likelihood (PRML) data detection channel advantageously is used to achieve high data density in writing and reading digital data on the disks. PRML data channels in DASD units are synchronous data detection channels where synchronous refers to the frequency and phase locking of the channel to the readback signal in order to detect the data properly.

In order for the data channel in a disk drive to read back data written in a sector, the channel must achieve both bit synchronization and word synchronization. Bit synchronization is the process of using acquisition gain and timing loops over a preamble pattern in order to achieve proper synchronous bit sampling, that is proper gain, phase, and frequency. Word synchronization is the process of finding the exact starting location of the data after the preamble field.

In current disk drives with increasing speed and data density, conventional word synchronization schemes are insufficient and generally provide poor performance. Miss-detecting the word sync pattern or finding it early or late corrupts the data detection in the entire sector. When the word synchronization detector fails to start the data time-varying-trellis correctly at the start of data, then the data error rates are degraded. A need exists for an improved word synchronization scheme.

SUMMARY OF THE INVENTION

A principal object of the present invention is to provide a method and apparatus for word synchronization with large coding distance and fault tolerance for a partial-response maximum-likelihood (PRML) data channel in a direct access storage device (DASD). Other important objects of the present invention are to provide such method and apparatus for word synchronization with large coding distance and fault tolerance substantially without negative effect and that overcome many of the disadvantages of prior art arrangements.

In brief, a method and apparatus are provided for word synchronization with large coding distance and fault tolerance for a partial-response maximum-likelihood (PRML) data channel in a direct access storage device (DASD). A Viterbi detector receives equalized PR4 samples including a predefined word synchronization pattern. The Viterbi detector is optimized for the predefined word synchronization pattern. The Viterbi detector includes a two-state Viterbi trellis and a word synchronization detector for the two-state Viterbi trellis.

In accordance with features of the invention, the predefined word synchronization pattern includes only even length magnets. The predefined word synchronization pattern is a repetition code including pairs of ones and pairs of zeros and includes multiple pattern match sequences. The Viterbi detector is a dedicated synchronization detector and is optimized for word synchronization performance with the predefined word synchronization pattern with branches removed from the Viterbi trellis, thus increasing coding distance. The two-state Viterbi trellis and word synchronization detector of the Viterbi detector operate on a 2T basis, where 1/T is the sample rate.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
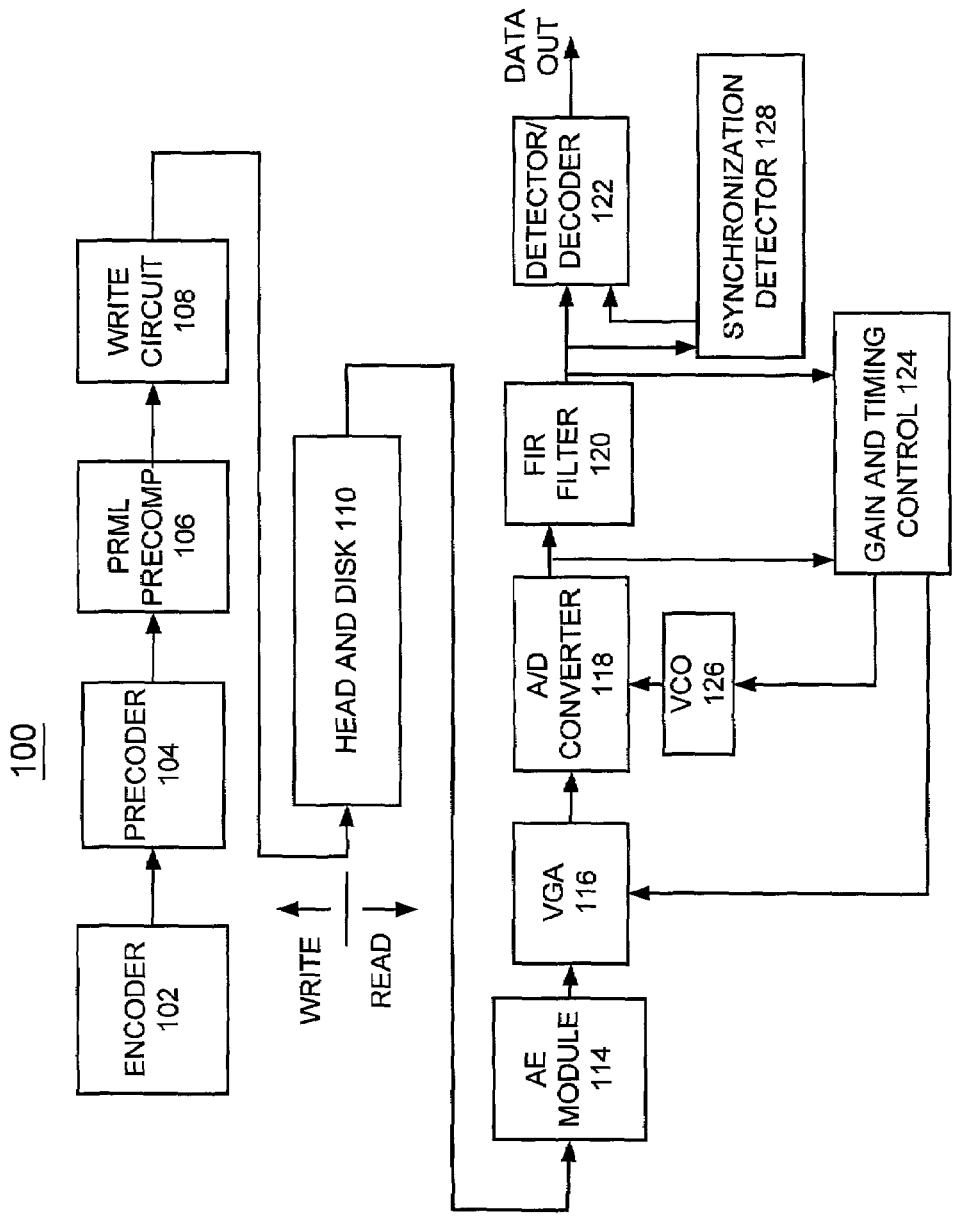
FIG. 1 is a block diagram representation illustrating a DASD data channel for implementing method for enhanced word synchronization in accordance with the preferred embodiment.

Having reference now to the drawings, in FIG. 1, there is shown a direct access storage device (DASD) data channel for implementing a method for word synchronization with large coding distance and fault tolerance in accordance with the preferred embodiment generally designated by the reference character 100. Direct access storage device (DASD) 100 includes a synchronization detector 128 for word synchronization with large coding distance and fault tolerance in accordance with the preferred embodiment.

Data to be written is applied to an encoder 102 for providing a modulation coded output having predefined run length constraints. A precoder 104 follows the encoder 102 described by a $1/(1 \oplus D^2)$ operation where D is a unit delay operator and the symbol $\oplus$ is used to represent modulo-2 addition. Modulo-2 addition can be thought of as an exclusive or operation. A PRML precomp 106 coupled to the precoder 104 provides a modulated binary pulse signal applied to a write circuit 108 that provides the modulated write current for writing to the disk surface at a head and disk block 110. An analog read signal is obtained from head and disk block 110 described by the $(1-D^2)$ operation. The readback signal is highpass-filtered by an arm electronic (AE) module 114, and its filtered output is applied to a variable gain amplifier (VGA) 116.

As shown in FIG. 1 in the PRML data channel 100, the readback signal is amplified by the variable gain amplifier (VGA) 116 and the amplified read signal is applied to an analog-to-digital converter (ADC) 118 that provides, for example, such as 64 possible 6-bit sampled values. The samples of the ADC 118 are applied to an equalizer 120, such as a 10 tap finite impulse response (FIR) digital filter. The filtered signal from the digital filter 120 is, for example, a class IV partial response (PR4) signal. The filtered PR4 signal from the digital filter 120 is applied to a detector/decoder 122. The detector/decoder 122 provides a detected data output. The filtered PR4 signal from the digital filter 120 and the samples of the ADC 118 are applied to a gain and timing control 124. Gain and timing control 124 provides a timing control signal to a voltage controlled oscillator (VCO) 126 coupled to the ADC 118. Gain and timing control 124 provides a gain control signal to the VGA 116. The filtered PR4 signal from the digital filter 120 is applied to a synchronization detector 128 of the preferred embodiment.

Synchronization detector 128 of the preferred embodiment is a dedicated detector circuit for use with synchronization (sync) field and sync word patterns and is not used for reading data in the data sector. The synchronization detector 128 is optimized for detecting sync field and sync word patterns since the synchronization detector 128 does not have to detect all magnetic patterns. Synchronization detector 128 of the preferred embodiment includes a word synchronization two-state 2T trellis as illustrated and described with respect to FIG. 3B and a word synchronization detector for the two-state 2T trellis as illustrated and described with respect to FIGS. 4A and 4B. An exemplary word synchronization pattern in accordance with the preferred embodiment for use with the synchronization detector 128 of the preferred embodiment is illustrated and described with respect to FIG. 2.

In accordance with features of the preferred embodiment, the synchronization detector 128 of the preferred embodiment provides improved bit-sync and word-sync performance versus signal to noise ratio (SNR) over previous schemes. Synchronization detector 128 of the preferred embodiment provides improved bit-sync and word-sync performance versus both timing offset and gain offset with very much improved performance as compared to other schemes. Synchronization detector 128 of the preferred embodiment allows proper start of time-varying-trellis for a 16-state data detector/decoder 122. Synchronization detector 128 of the preferred embodiment includes a simple to build two-state detector operating on a 2T basis using a difference metric implementation with removed branches to create a large coding distance, where 1/T is the sample rate.

Figure 2:
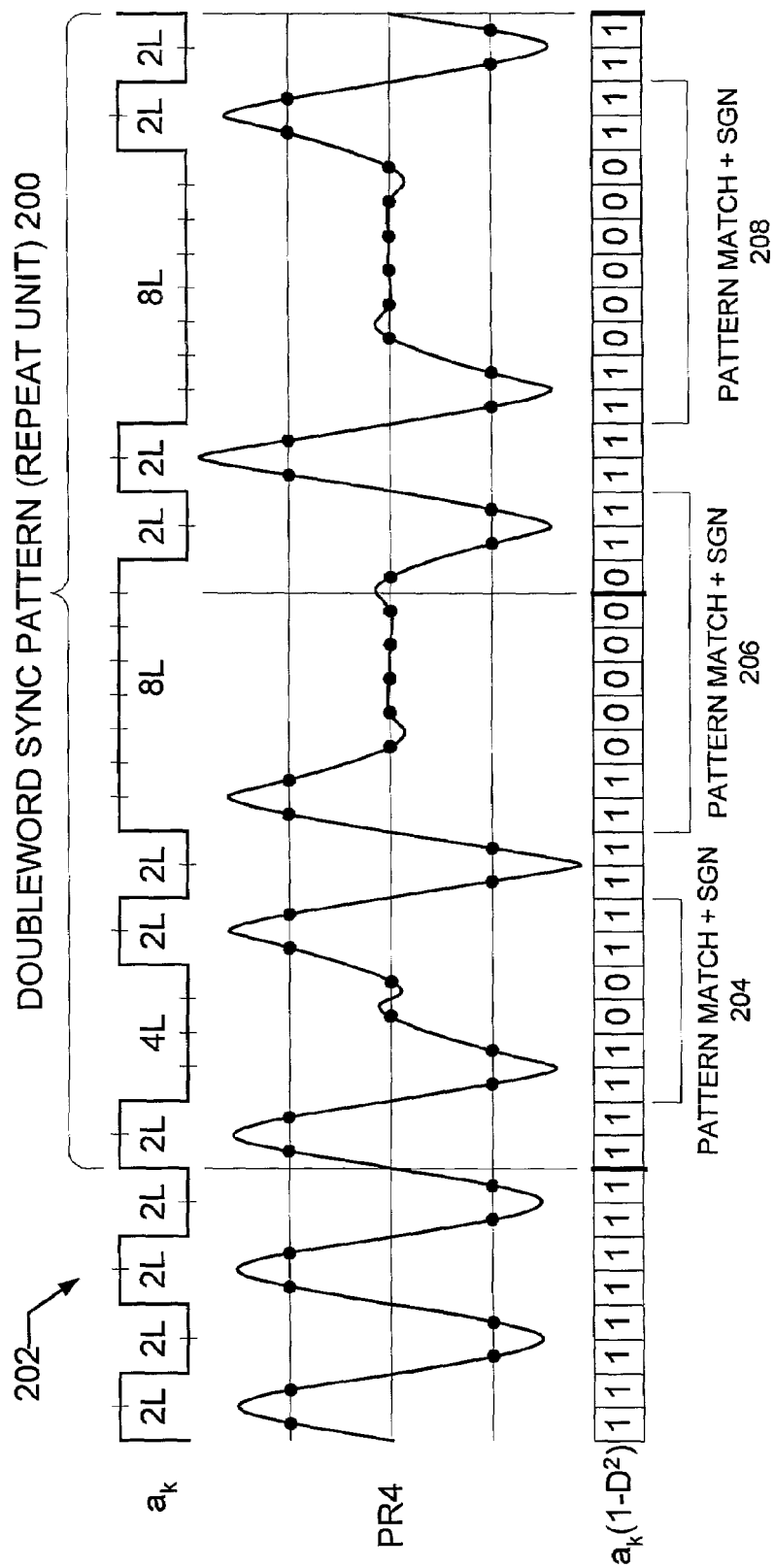
FIG. 2 is a diagram illustrating a word synchronization pattern in accordance with the preferred embodiment.

Referring now to FIG. 2, there is shown a word synchronization pattern in accordance with the preferred embodiment. As shown in FIG. 2, an encoder sequence $a_k$ for the sync field and word synchronization pattern is shown at the top of the diagram. The corresponding PR4 signal is shown in the center and the corresponding detected sequence $a_k(1-D^2)$ is shown at the bottom of the chart. The word synchronization pattern of the preferred embodiment includes a double word sync pattern or repeat unit 200. The word synchronization pattern 200 includes only even length magnets. This is easier to write in DASD data channel 100. The word synchronization pattern 200 follows a synchronization field generally designated by 202. In FIG. 2, a representative portion of the sync field 202 is shown. The word synchronization pattern 200 is a repetition code including pairs of zeros and pairs of ones. The word synchronization pattern 200 includes multiple pattern match and sign sequences 204, 206, and 208. A word sync field preceding customer data may include, for example, a four byte word sync or a single word synchronization pattern 200, an eight byte word sync or a pair of concatenated word synchronization patterns 200 or a twelve byte word sync or three concatenated word synchronization patterns 200.

Figure 3B:
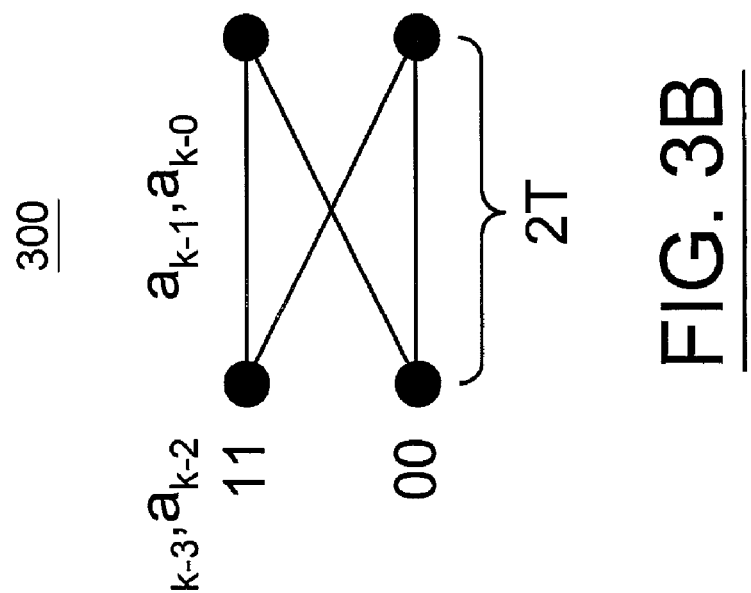
FIG. 3B illustrates a word synchronization two-state 2T trellis in accordance with the preferred embodiment.
Figure 3A:
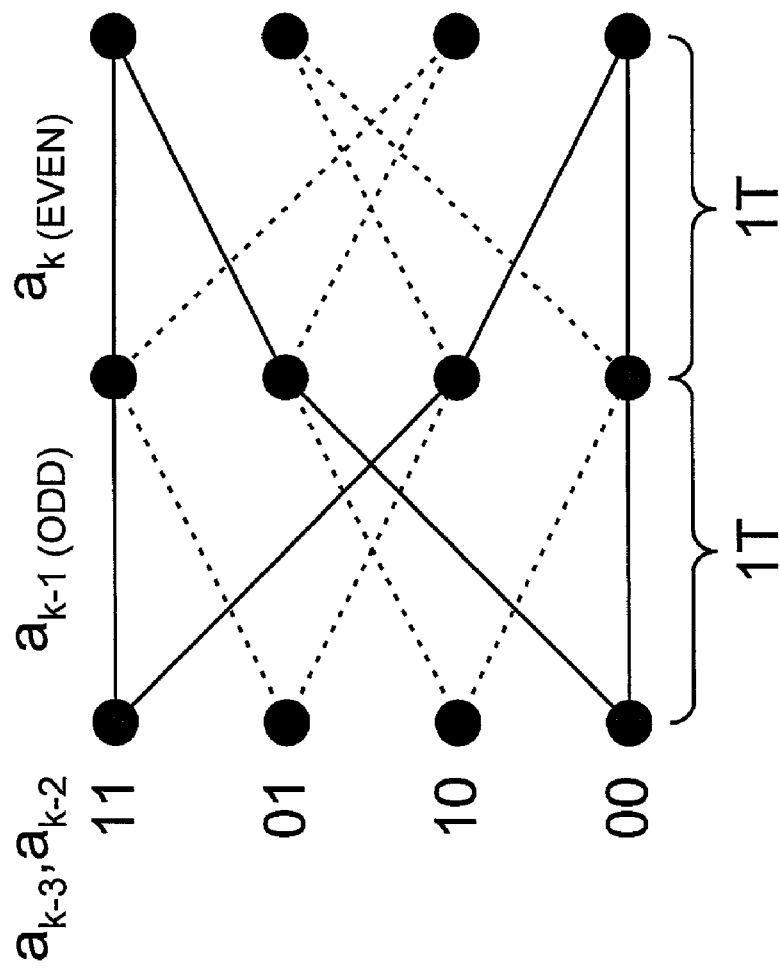
FIG. 3A illustrates a four state 1T trellis detector.

Referring now to FIGS. 3A and 3B, FIG. 3A illustrates a four-state trellis detector operating on a 1T basis. FIG. 3B illustrates a word synchronization Viterbi two-state trellis in accordance with the preferred embodiment generally designated by the reference character 300. Word synchronization Viterbi two-state trellis 300 operates on a 2T basis. Word synchronization Viterbi two-state trellis 300 is optimized for performance by removing branches from the trellis as compared to the four-state trellis of FIG. 3A. In the four-state trellis of FIG. 3A, trellis branches are shown in dotted line that are never accessed in detecting the sync field 202 and word sync pattern 200. Word synchronization Viterbi two-state trellis 300 having removed branches from the trellis, provides increased coding distance. Possible trellis choices for word synchronization two-state trellis 300 are illustrated and described with respect to FIGS. 5A, 5B and 5C. Viterbi two-state trellis 300 is clocked every 2T bit periods. The gain and timing control 124 and FIR filter 120 guarantees proper modulo 2 clocking phase of the word synchronization Viterbi two-state trellis 300.

Figure 4A:
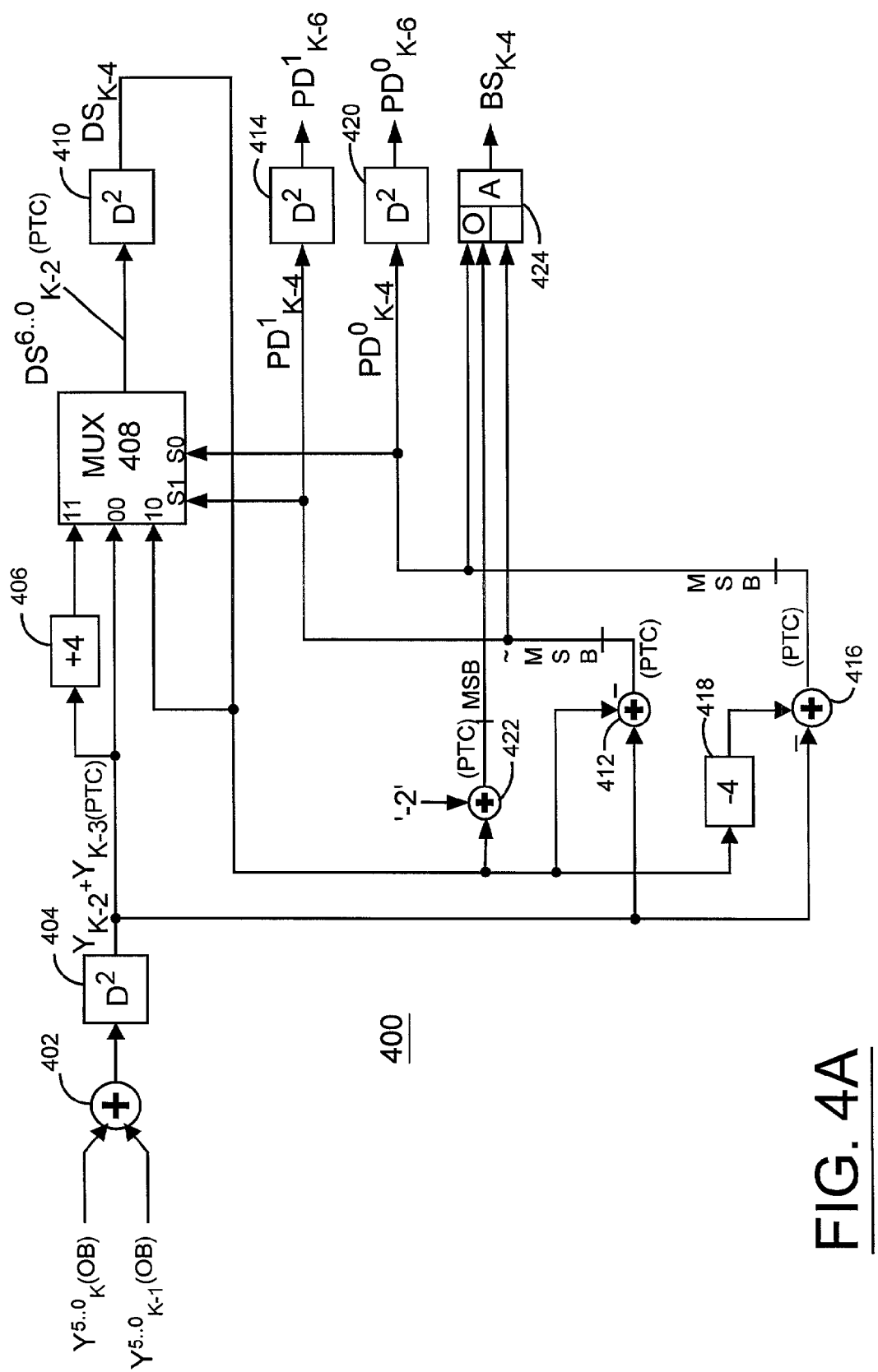
FIGS. 4A and 4B together illustrate an exemplary word synchronization detector for the two-state trellis of FIG. 3B in accordance with the preferred embodiment.
Figure 4B:
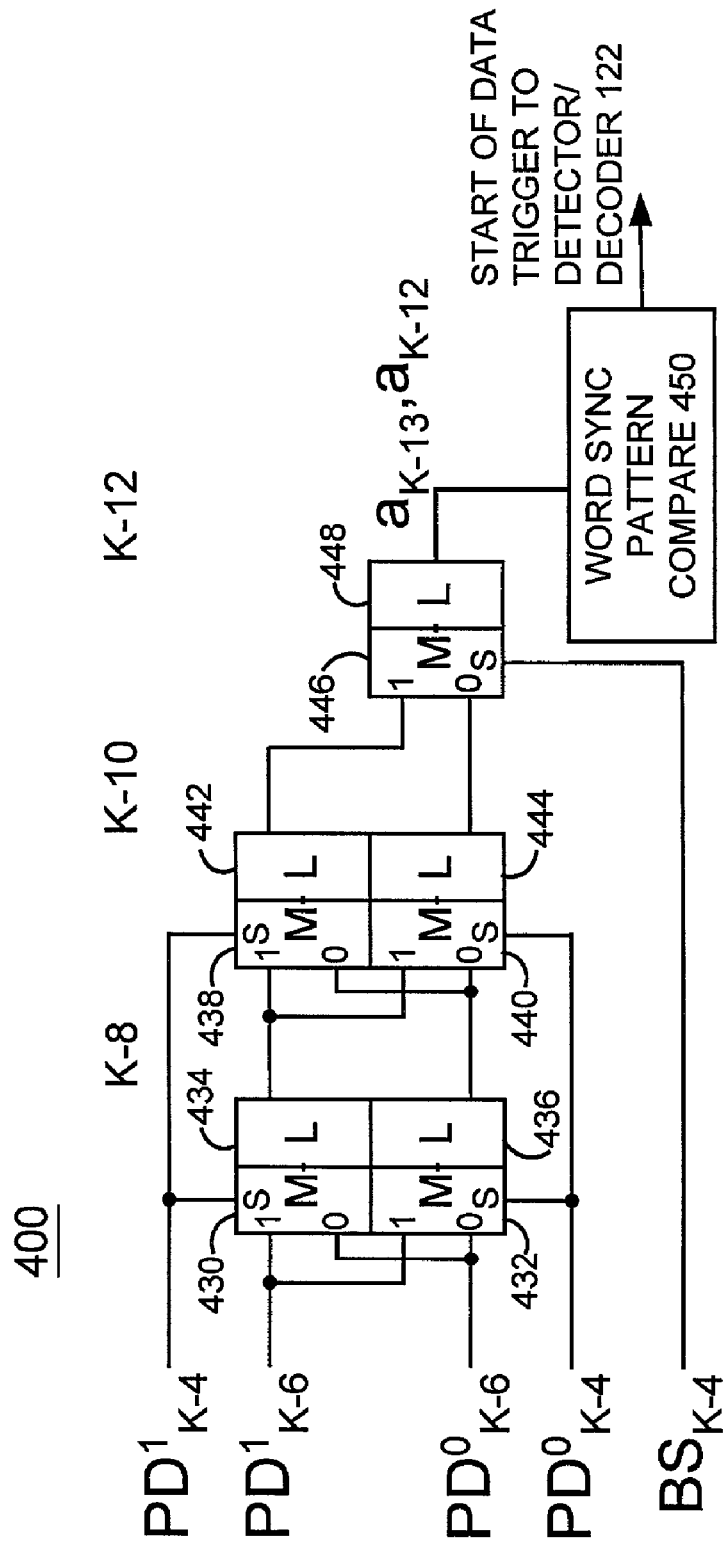

Referring now to FIGS. 4A and 4B, there is shown an exemplary word synchronization add/compare/select path memory detector 400 for the Viterbi two-state trellis 300 of FIG. 3B in accordance with the preferred embodiment. Word synchronization detector 400 operates on a 2T basis. Word synchronization detector 400 receives equalized PR4 6-bit inputs $Y^5 \cdots {}^0{}_K(OB)$ and $Y^5 \cdots {}^0{}_{K-1}(OB)$, where OB indicates offset binary format. Inputs $Y^5 \cdots {}^0{}_K(OB)$ and $Y^5 \cdots {}^0{}_{K-1}(OB)$ are applied to an add 402 and added together. The added inputs $Y^5 \cdots {}^0{}_K(OB)+Y^5 \cdots {}^0{}_{K-1}(OB)$ at an output of add 402 are applied to a delay $D^2$ 404. The output of delay $D^2$ 404 labeled $Y_{K-2}+Y_{K-3}(PCT)$ where PCT indicates pseudo twos complement format, is applied to an input 00 of a three-way multiplexer (MUX) 408 and also is applied to a shift +4 406. The output $(Y_{K-2}+Y_{K-3})+4$ of shift +4 406 is applied to an input 11 of MUX 408. The output of MUX 408 labeled $DS^6 \cdots {}^0{}_{K-2}(PCT)$ where DS indicates a difference of states or difference metric for trellis 300, is applied to a delay $D^2$ 410 for storing the difference metric for trellis 300. The difference metric output $DS_{K-4}$ of delay $D^2$ 410 is applied to an input 10 of MUX 408 to hold the difference metric at MUX input 10. The output of delay $D^2$ 404 $Y_{K-2}+Y_{K-3}$ is applied to an add 412 and the output of delay $D^2$ 410 is applied to a − input of the add 412 for comparing incoming samples with the difference metric and the output goes to MUX select. The output of add 412 labeled (PCT)~MSB and $PD^1{}_{K-4}$, where ~MSB indicates an inverted most significant bit, is applied to a delay $D^2$ 414 providing an output labeled $PD^1{}_{K-6}$, where PD indicates path data for path memory. The inverted most significant bit output $PD^1{}_{K-4}$ of add 412 is applied to a select input S1 of MUX 408. The output of delay $D^2$ 404 (PCT) is applied to an add 416 and the output of delay $D^2$ 410 is applied to a shift of −4 418 and then the output of the shift of −4 418 is applied to the add 416 for comparing incoming samples with the difference metric shifted by −4 and the output goes to MUX select. The output of add 416 labeled (PCT) MSB and $PD^0{}_{K-4}$, where MSB indicates a most significant bit, is applied to a delay $D^2$ 420 providing an output labeled $PD^0{}_{K-6}$. The output $PD^0{}_{K-4}$ of add 416 is applied to a select input S0 of MUX 408. The difference metric output of delay $D^2$ 410 and a −2 input are applied to an add 422 providing an output labeled (PCT) MSB. The outputs of add 422, 412, and 416 are applied to an OR/AND function 424 that provides an output $BS_{K-4}$. The output $BS_{K-4}$ is a best metric selection at a current time used to pull data out of the path memory shown in FIG. 4B for a current best state.

Referring to FIG. 4B, word synchronization detector 400 includes a path memory providing a survivor sequence. Path memory of word synchronization detector 400 includes a first pair of two-way multiplexers (M) 430 and 432, each receiving inputs $PD^1_{K-6}$ and $PD^0_{K-6}$ from the output of delays 414 and 420 and respectively receiving select inputs $PD^1_{K-4}$ and $PD^0_{K-4}$ from the respective input of delays 414 and 420. A respective latch 434 and 436 is connected to the respective output of multiplexers (M) 430 and 432. Each latch 434 and 436 is connected to the inputs of a second pair of two-way multiplexers (M) 438 and 440. The multiplexers (M) 430 and 432 include a multiplexer select input respectively receiving select inputs $PD^1_{K-4}$ and $PD^0_{K-4}$. A respective latch 442 and 444 is connected to the respective output of multiplexers (M) 438 and 440. Each latch 442 and 444 is connected to an input of a multiplexer (M) 446. The best metric selection $BS_{K-4}$ is applied to a multiplexer select input of multiplexer (M) 446. A latch 448 connected to the output of multiplexer (M) 446. Latch 448 provides a detected data path memory output labeled $a_{K-13}$, $a_{K-14}$, where $a_{K-13}$, $a_{K-14}$ indicates a calculation delay. The detected data path memory output $a_{K-13}$, $a_{K-14}$ is applied to a word sync pattern compare 450. Word sync pattern compare 450 compares the detected data path memory output sequence $a_{K-13}$, $a_{K-14}$ with the word sync pattern 200 to identify pattern matches 204, 206, 208 and applies a start of data trigger signal to the detector/decoder 122.

In the operation of word synchronization Viterbi two-state trellis 300 together with word synchronization add/compare/select path memory detector 400, where a word sync field preceding customer data includes a four byte word sync including a single word synchronization pattern 200, a minimum of two out of three of the pattern matches 204, 206, 208 are identified by word sync pattern compare 450 to provide the start of data trigger for detector/decoder 122 of FIG. 1. With an eight byte word sync including a pair of concatenated word synchronization patterns 200, a minimum of three out of six of the pattern matches 204, 206, 208 are identified by word sync pattern compare 450 to provide the start of data trigger for detector/decoder 122. With a twelve byte word sync including three concatenated word synchronization patterns 200, then four of nine of the pattern matches 204, 206, 208 are needed to provide the start of data trigger for detector/decoder 122.

Figure 5A:
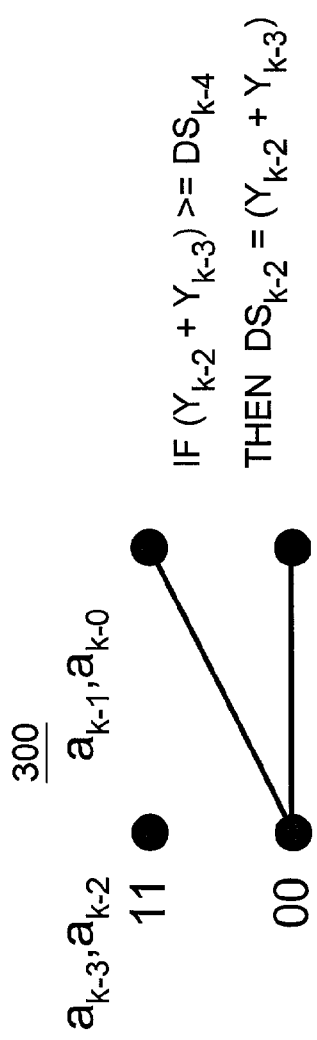
FIGS. 5A, 5B, 5C and 5D illustrate trellis selection operation of the exemplary word synchronization detector of FIGS. 4A and 4B for the two-state trellis of FIG. 3B in accordance with the preferred embodiment.
Figure 5B:
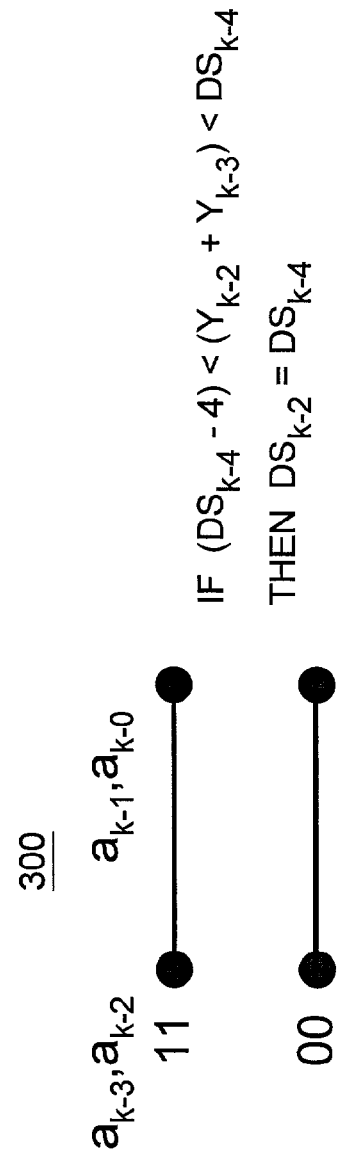
Figure 5C:
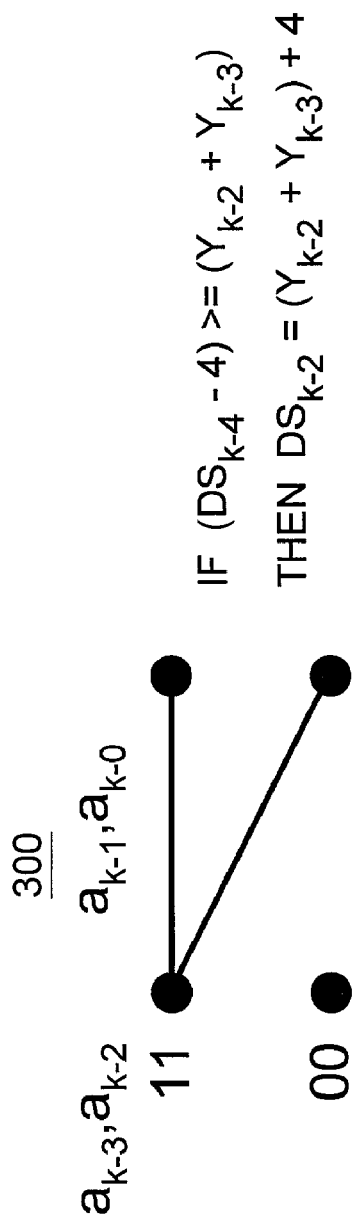
Figure 5D:
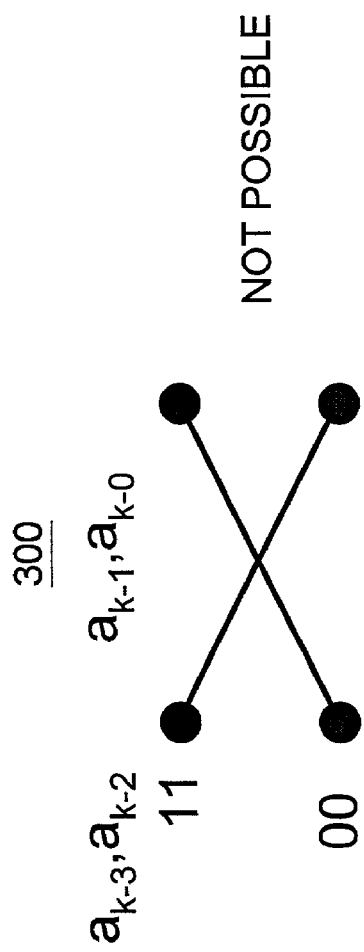

FIGS. 5A, 5B, 5C and 5D illustrate operation of the exemplary word synchronization detector 400 for the two-state trellis 300 in accordance with the preferred embodiment. FIGS. 5A, 5B, and 5C illustrate possible trellis choices when comparing two branches into one state and two branches into the other state of the two-state trellis 300. FIG. 5D illustrates an impossible trellis choice with the diagonal branches crossing.

FIG. 5A illustrates one of three possible trellis choices represented by:

If $(Y_{K-2}+Y_{K-3}) >= DS_{K-4}$

Then $DS_{K-2}=(Y_{K-2}+Y_{K-3})$

When the added input samples $Y_{K-2}+Y_{K-3}$ at the output of delay $D^2$ 404 is greater than or equal to the difference metric $DS_{K-4}$ at the output of delay $D^2$ 410, then the output of multiplexer 408 $DS_{K-2}$ equals $(Y_{K-2}+Y_{K-3})$ Add 412 compares the incoming samples $Y_{K-2}+Y_{K-3}$ with the difference metric $DS_{K-4}$ and applies the MUX select S1 so that the multiplexer 408 selects the added input samples $Y_{K-2}+Y_{K-3}$ at multiplexer input 00.

FIG. 5B illustrates another possible trellis choice represented by:

If $(DS_{K-4}-4)<(Y_{K-2}+Y_{K-3})<DS_{K-4}$

Then $DS_{K-2}=DS_{K-4}$

When the shifted difference metric $DS_{K-4}-4$ at the output of shift by −4 418 is less than the added input samples $Y_{K-2}+Y_{K-3}$ at the output of delay $D^2$ 404 is less than the difference metric $DS_{K-4}$ at the output of delay $D^2$ 410, then $DS_{K-2}$ equals $DS_{K-4}$. Then the multiplexer 408 selects $DS_{K-4}$ at multiplexer input 10. Add 416 compares the incoming samples $Y_{K-2}+Y_{K-3}$ with the shifted difference metric $DS_{K-4}-4$ and provides the multiplexer select input S0. Add 412 compares the incoming samples $Y_{K-2}+Y_{K-3}$ with the difference metric $DS_{K-4}$ and applies the MUX select S1. The multiplexer 408 selects the difference metric $DS_{K-4}$ at multiplexer input 10 responsive to the output of adds 412 and 416.

FIG. 5C illustrates another possible trellis choice represented by:

If $(DS_{K-4}-4)>=(Y_{K-2}+Y_{K-3})$

Then $DS_{K-2}=(Y_{K-2}+Y_{K-3})+4$

When the shifted difference metric $DS_{K-4}-4$ at the output of shift by −4 418 is less than the added input samples $Y_{K-2}+Y_{K-3}$ at the output of delay $D^2$ 404, then $DS_{K-2}$ equals $(Y_{K-2}+Y_{K-3})+4$ at the output of shift +4 406. Multiplexer 408 selects $(Y_{K-2}+Y_{K-3})+4$ at multiplexer input 11. Add 416 compares the incoming samples $Y_{K-2}+Y_{K-3}$ with the shifted difference metric $DS_{K-4}-4$ and provides the multiplexer select input S0.

While the present invention has been described with reference to the details of the embodiments of the invention shown in the drawing, these details are not intended to limit the scope of the invention as claimed in the appended claims.

What is claimed is:

1. Apparatus for word synchronization with large coding distance and fault tolerance for a partial-response maximum-likelihood (PRML) data channel in a direct access storage device (DASD) comprising:
    a Viterbi detector for receiving equalized PR4 samples including a predefined word synchronization pattern; said Viterbi detector being optimized for said predefined word synchronization pattern; said Viterbi detector including
    a two-state Viterbi trellis;
    a word synchronization detector for said two-state Viterbi trellis; said word synchronization detector implements a difference metric for said two-state Viterbi trellis and includes a three-way multiplexer; said three-way multiplexer includes an input of added incoming samples, said added incoming samples represented by $(Y_{K-2}+Y_{K-3})$ and
    said two-state Viterbi trellis and said word synchronization detector are operated on a 2T basis, where 1/T is the sample rate.

2. Apparatus for word synchronization with large coding distance and fault tolerance as recited in claim 1 wherein said predefined word synchronization pattern includes multiple pattern match sequences.

3. Apparatus for word synchronization with large coding distance and fault tolerance as recited in claim 1 wherein said predefined word synchronization pattern includes three pattern match sequences.

4. Apparatus for word synchronization with large coding distance and fault tolerance as recited in claim 1 wherein said predefined word synchronization pattern includes a repetition code including pairs of zeros and pairs of ones.

5. Apparatus for word synchronization with large coding distance and fault tolerance as recited in claim 1 wherein said three-way multiplexer includes an input of added and shifted incoming samples, said added and shifted incoming samples represented by $(Y_{K-2}+Y_{K-3})+4$.

6. Apparatus for word synchronization with large coding distance and fault tolerance as recited in claim 5 wherein said three-way multiplexer includes an input of a difference metric, said difference metric represented by $DS_{K-4}$.

7. Apparatus for word synchronization with large coding distance and fault tolerance as recited in claim 6 wherein said three-way multiplexer includes select inputs for selecting said added incoming samples $(Y_{K-2}+Y_{K-3})$ responsive to said added incoming samples $(Y_{K-2}+Y_{K-3})$ being greater than or equal to said difference metric $DS_{K-4}$.

8. Apparatus for word synchronization with large coding distance and fault tolerance as recited in claim 6 wherein said three-way multiplexer includes select inputs for selecting said added and shifted incoming samples represented by $(Y_{K-2}+Y_{K-3})+4$ responsive to a shifted difference metric $DS_{K-4}-4$ being greater than or equal to said added incoming samples $(Y_{K-2}+Y_{K-3})$.

9. Apparatus for word synchronization with large coding distance and fault tolerance as recited in claim 6 wherein said three-way multiplexer includes select inputs for selecting said difference metric $DS_{K-4}$ responsive to a shifted difference metric $DS_{K-4}-4$ being less than said added incoming samples $(Y_{K-2}+Y_{K-3})$ and said added incoming samples $(Y_{K-2}+Y_{K-3})$ being less than said difference metric $DS_{K-4}$.

10. Apparatus for word synchronization with large coding distance and fault tolerance as recited in claim 1 wherein said word synchronization detector implements a difference metric for said two-state Viterbi trellis and includes a path memory providing detected output decisions $a_{K-13}$, $a_{K-12}$.

11. Apparatus for word synchronization with large coding distance and fault tolerance as recited in claim 10 wherein said detected output decisions $a_{K-13}$, $a_{K-12}$ of said path memory are compared by a predefined word synchronization pattern compare function with said predefined word synchronization pattern; said predefined word synchronization pattern including multiple pattern match sequences.

12. Apparatus for word synchronization with large coding distance and fault tolerance as recited in claim 11 wherein said predefined word synchronization pattern compare function identifies at least a predefined subset of said multiple pattern match sequences and generates a start of data trigger for the partial-response maximum-likelihood (PRML) data channel.

13. A method for word synchronization with large coding distance and fault tolerance for a partial-response maximum-likelihood (PRML) data channel in a direct access storage device (DASD) comprising the steps of:

sensing a readback signal including a predefined word synchronization pattern said predefined word synchronization pattern including only one or more sequential pairs of zeros and one or more sequential pairs of ones; said predefined word synchronization pattern including multiple pattern match sequences;

providing a dedicated Viterbi detector optimized for said predefined word synchronization pattern and said Viterbi detector including a two-state Viterbi trellis and a word synchronization detector for said two-state Viterbi trellis;

applying equalized PR4 samples from said readback signal including said predefined word synchronization pattern to said dedicated Viterbi detector;

detecting a predefined number of said multiple pattern match sequences of said predefined word synchronization pattern with said Viterbi detector; and generating a start of data trigger for the partial-response maximum-likelihood (PRML) data channel.

14. A method for word synchronization with large coding distance and fault tolerance for a partial-response maximum-likelihood (PRML) data channel as recited in claim 13 wherein the step of providing a dedicated Viterbi detector optimized for said predefined word synchronization pattern includes the step of optimizing said Viterbi detector by eliminating branches from said two-state Viterbi trellis, thereby increasing coding distance.

15. A method for word synchronization with large coding distance and fault tolerance for a partial-response maximum-likelihood (PRML) data channel as recited in claim 13 wherein said predefined word synchronization pattern includes three pattern match sequences and wherein the step of detecting said predefined number of said multiple pattern match sequences of said predefined word synchronization pattern with said Viterbi detector includes the step of detecting two of said three pattern match sequences of said predefined word synchronization pattern.

* * * * *